(12) United States Patent
Lee et al.

(10) Patent No.: US 9,204,071 B2
(45) Date of Patent: *Dec. 1, 2015

(54) DIGITAL DOUBLE SAMPLING METHOD, A RELATED CMOS IMAGE SENSOR, AND A DIGITAL CAMERA COMPRISING THE CMOS IMAGE SENSOR

(75) Inventors: Dong-Myung Lee, Seoul (KR); Gun-Hee Han, Goyang-si (KR); Seog-Heon Ham, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 37 days.

This patent is subject to a terminal disclaimer.

(21) Appl. No.: 13/183,533

(22) Filed: Jul. 15, 2011

(65) Prior Publication Data

US 2011/0266417 A1    Nov. 3, 2011

Related U.S. Application Data

(63) Continuation of application No. 11/877,027, filed on Oct. 23, 2007, now Pat. No. 7,995,123.

(30) Foreign Application Priority Data

Nov. 13, 2006  (KR) .................. 10-2006-0111798

(51) Int. Cl.
  *H04N 5/357* (2011.01)
  *H04N 5/378* (2011.01)

(52) U.S. Cl.
  CPC ............. *H04N 5/378* (2013.01); *H04N 5/3575* (2013.01)

(58) Field of Classification Search
  CPC ....... H03K 5/131; H03K 5/135; H03K 5/132; H03K 4/026; H03K 3/356017; H03K 3/356095; H03K 23/58; H03K 23/588; H03K 21/38; H03K 17/223; H03K 17/20; H03K 5/19; H03K 5/00006; H03K 23/68; H03K 23/667; H03K 5/13; H03K 5/15; H03K 2005/00286; H03K 7/06; H03K 3/72; H03K 23/004; H03K 3/356; H03K 21/12; H03K 2005/00058; H03K 2005/00247; G06F 5/06; G06F 7/68; G06F 1/0328; G06F 1/24; G06F 1/08; G06F 1/324; G05B 19/106; G11C 7/1051; G11C 7/1066; G11C 7/065; G11C 7/067; G11C 11/4091; G11C 7/106; G11C 7/1006; G11C 7/1048; G11C 29/00; G11C 29/783; G11C 29/023; G11C 29/028; G11C 29/50016; G11C 11/40; G11C 11/40618; G11C 11/4096; G11C 11/4076; G11C 2207/2272; H04N 5/378; H04N 5/3575; H03M 1/002; H03M 1/12; H03L 7/0814; H03L 7/00; H03L 7/0812; G08G 1/07; H04M 1/505; H03H 17/08; H03B 28/00; G01R 31/2846; H04L 7/0331; H04L 7/033
  USPC .................................... 348/294–324
  See application file for complete search history.

(56) References Cited

U.S. PATENT DOCUMENTS

| | | | |
|---|---|---|---|
| 604,278 A | * | 5/1898 | Vollrath ........................ 301/81 |
| 5,398,270 A | * | 3/1995 | Cho et al. ....................... 377/39 |

(Continued)

FOREIGN PATENT DOCUMENTS

| | | |
|---|---|---|
| JP | 2001231051 A | 8/2001 |
| JP | 2005210335 A | 8/2005 |

(Continued)

*Primary Examiner* — Pritham Prabhakher
(74) *Attorney, Agent, or Firm* — Volentine & Whitt, PLLC

(57) ABSTRACT

A digital double sampling method, a related complementary metal oxide semiconductor (CMOS) image sensor, and a digital camera comprising the CMOS image sensor are disclosed. The method includes generating first digital data corresponding to an initial voltage level apparent in a pixel in response to a reset signal, inverting the first digital data, outputting a detection voltage corresponding to image data received from outside of the CMOS image sensor, and counting in synchronization with a clock signal, starting from an initial value equal to the inverted first digital data, and for an amount of time responsive to a voltage level of the detection voltage.

6 Claims, 7 Drawing Sheets

(56) References Cited

U.S. PATENT DOCUMENTS

| | | | |
|---|---|---|---|
| 5,432,830 A * | 7/1995 | Bonnot | 417/41 |
| 5,491,438 A * | 2/1996 | Miyazaki et al. | 327/144 |
| 5,499,280 A * | 3/1996 | Wilson et al. | 377/108 |
| 5,877,715 A | 3/1999 | Gowda et al. | |
| 5,886,562 A * | 3/1999 | Garrity et al. | 327/415 |
| 5,920,274 A | 7/1999 | Gowda et al. | |
| 6,711,084 B2 * | 3/2004 | Ishida et al. | 365/226 |
| 6,753,912 B1 | 6/2004 | Wayne | |
| 6,965,407 B2 | 11/2005 | Boemler et al. | |
| 7,046,052 B1 * | 5/2006 | Percey et al. | 327/115 |
| 7,149,275 B1 * | 12/2006 | Hubbard | 377/47 |
| 7,250,897 B2 | 7/2007 | Oh | |
| 7,292,177 B2 | 11/2007 | Muramatsu et al. | |
| 7,446,806 B2 | 11/2008 | Carlson et al. | |
| 7,629,914 B2 | 12/2009 | Muramatsu et al. | |
| 7,952,510 B2 * | 5/2011 | Shimomura et al. | 341/164 |
| 2002/0041538 A1 * | 4/2002 | Hayashi | 368/121 |
| 2002/0118289 A1 | 8/2002 | Choi | |
| 2002/0186588 A1 * | 12/2002 | Cho et al. | 365/185.09 |
| 2003/0122598 A1 * | 7/2003 | Kim et al. | 327/158 |
| 2003/0142566 A1 * | 7/2003 | Sohn et al. | 365/201 |
| 2005/0134714 A1 * | 6/2005 | Carlson et al. | 348/302 |
| 2005/0140408 A1 * | 6/2005 | Lim | 327/158 |
| 2005/0242849 A1 * | 11/2005 | Muramatsu et al. | 327/151 |
| 2006/0012696 A1 | 1/2006 | Zarnowski et al. | |
| 2008/0126814 A1 | 5/2008 | Burkland et al. | |

FOREIGN PATENT DOCUMENTS

| | | |
|---|---|---|
| KR | 1998078099 A | 11/1998 |
| KR | 1020030008325 A | 1/2003 |
| KR | 1020000027240 A | 5/2005 |
| KR | 1020060077211 A | 7/2006 |
| KR | 1020060104197 A | 10/2006 |

* cited by examiner

DIGITAL DOUBLE SAMPLING METHOD, A RELATED CMOS IMAGE SENSOR, AND A DIGITAL CAMERA COMPRISING THE CMOS IMAGE SENSOR

CROSS-REFERENCE TO RELATED APPLICATION

This application is a Continuation application U.S. application Ser. No. 11/877,027, filed Oct. 23, 2007, which claims priority to Korean Patent Application No. 10-2006-111798, filed on Nov. 13, 2006, the subject matter of which is hereby incorporated by reference in its entirety.

BACKGROUND OF THE INVENTION

1. Field of the Invention

Embodiments of the invention relate to a digital double sampling method, a related complementary metal oxide semiconductor (CMOS) image sensor, and a digital camera comprising the CMOS image sensor. In particular, embodiments of the invention relate to a digital double sampling method comprising inverting digital data, a related CMOS image sensor, and a digital camera comprising the CMOS image sensor.

2. Description of the Related Art

CMOS image sensors, which are widely used in digital cameras, convert optical signals into electrical signals. An operation for converting an optical signal into an electrical signal is performed by a pixel of the CMOS image sensor, wherein the pixel includes a photodiode and a read-out circuit. The photodiode generates electric charges using absorbed light, converts the generated electric charges into an analog current, and delivers the analog current to the read-out circuit. The read-out circuit converts the analog signal into a digital signal and outputs the digital signal.

In an analog-to-digital conversion process, a comparator receives an analog voltage and compares the analog voltage with a ramp voltage. The comparator compares the analog voltage with the ramp voltage, and uses a counter to count until the ramp voltage is greater than an analog voltage. Once the counter stops counting, a count value is digital data corresponding to an analog voltage, that is, the count value is the digital data into which the analog voltage has been converted.

An up-down counter is typically used to perform digital double sampling (DDS). DDS means obtaining a difference (Dsig−Drst) between digital data Drst obtained by converting a first analog signal output by an initialized pixel into digital data, and digital data Dsig obtained by converting a second analog signal received from a pixel that has received an external image signal into digital data, wherein the second analog signal corresponds to an external image signal.

Because the up-down counter performs up-count and down-count functions, the up-down counter has a relatively large number of gates. Therefore, the up-down counter occupies a relatively large area. In addition, power consumption is limited in a high resolution image sensor.

SUMMARY OF THE INVENTION

Embodiments of the invention provide a CMOS image sensor having a reduced number of gates, a digital camera comprising the CMOS image sensor, and a digital double sampling (DDS) method that consumes less power.

In one embodiment, the invention provides a digital double sampling method of a complementary metal oxide semiconductor (CMOS) image sensor. The method comprises generating first digital data corresponding to an initial voltage level apparent in a pixel in response to a reset signal, inverting the first digital data, outputting a detection voltage corresponding to image data received from outside of the CMOS image sensor, and counting in synchronization with a clock signal, starting from an initial value equal to the inverted first digital data, and for an amount of time responsive to a voltage level of the detection voltage.

In another embodiment, the invention provides a complementary metal oxide semiconductor (CMOS) image sensor comprising a controller generating a clock signal and first control signals, and a pixel outputting a pixel signal in response to the first control signals during a reset mode and during an image input mode, wherein the pixel signal output by the pixel during the image input mode corresponds to image data received from outside of the CMOS image sensor. The CMOS image sensor further comprises a comparator comparing the pixel signal with a ramp signal and activating a comparison signal when a voltage level of the ramp signal is less than a voltage level of the pixel signal, a counter counting in response to the clock signal to a first count value during the reset mode, inverting the first count value during the image input mode, counting in response to the clock signal until the comparison signal is activated to obtain a second count value, and outputting the second count value. Additionally, the counting in response to the clock signal until the comparison signal is activated begins from an initial value equal to the inverted first count value.

In yet another embodiment, the invention provides a digital camera comprising a processor, and a complementary metal oxide semiconductor (CMOS) sensor connected to the processor through a bus. The CMOS sensor comprises a controller generating a clock signal and first control signals, and a pixel outputting a pixel signal in response to the first control signals during a reset mode and during an image input mode, wherein the pixel signal output by the pixel during the image input mode corresponds to image data received from outside of the CMOS image sensor. The CMOS image sensor further comprises a comparator comparing the pixel signal with a ramp signal and activating a comparison signal when a voltage level of the ramp signal is less than a voltage level of the pixel signal, and a counter counting in response to the clock signal to a first count value during the reset mode, inverting the first count value during the image input mode, counting in response to the clock signal until the comparison signal is activated to obtain a second count value, and outputting the second count value. Additionally, the counting in response to the clock signal until the comparison signal is activated begins from an initial value equal to the inverted first count value.

BRIEF DESCRIPTION OF THE DRAWINGS

Embodiments of the invention will be described herein with reference to the accompanying drawings, in which.

DESCRIPTION OF EMBODIMENTS

Throughout the drawings, like reference symbols indicate like or similar elements.

Figure 1:
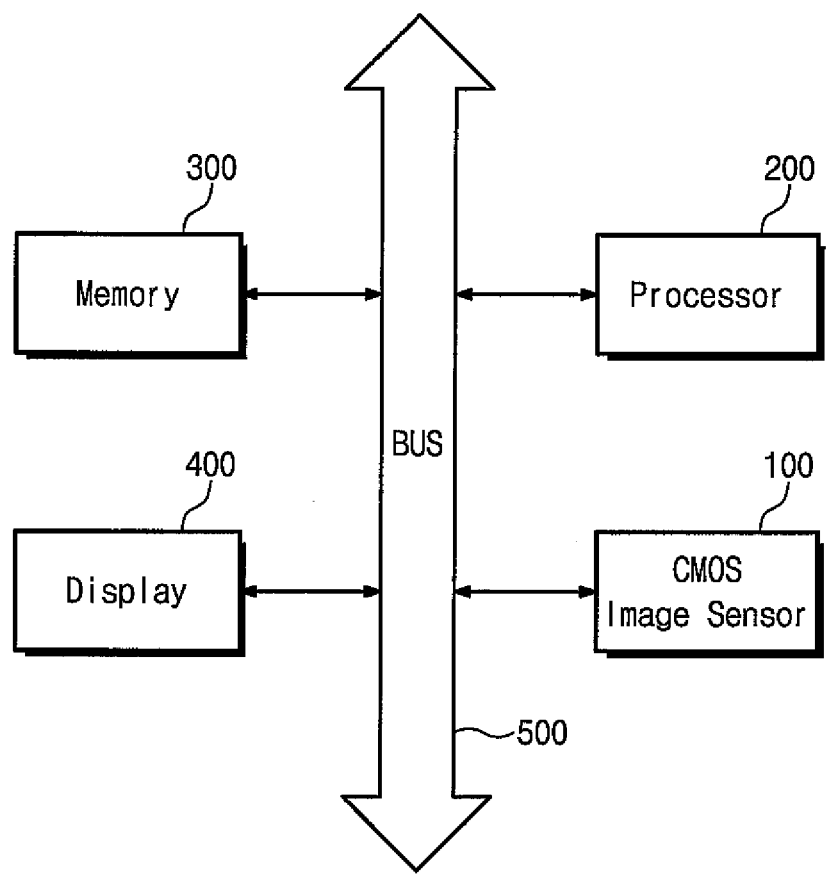
FIG. 1 is a block diagram illustrating a digital camera system comprises a CMOS image sensor in accordance with an embodiment of the invention.

FIG. 1 is a block diagram illustrating a digital camera system comprising a CMOS image sensor. Referring to FIG. 1, the digital camera system comprises a CMOS image sensor 100, a processor 200, a memory 300, a display 400, and a bus 500. Under the control of processor 200, CMOS image sensor 100 captures external image data. In addition, the captured image data is stored in memory 300 through bus 500. Also, under the control of processor 200, image data stored in memory 300 is reproduced by display 400. CMOS image sensor 100, in accordance with an embodiment of the invention, will now be described in more detail.

Figure 2:
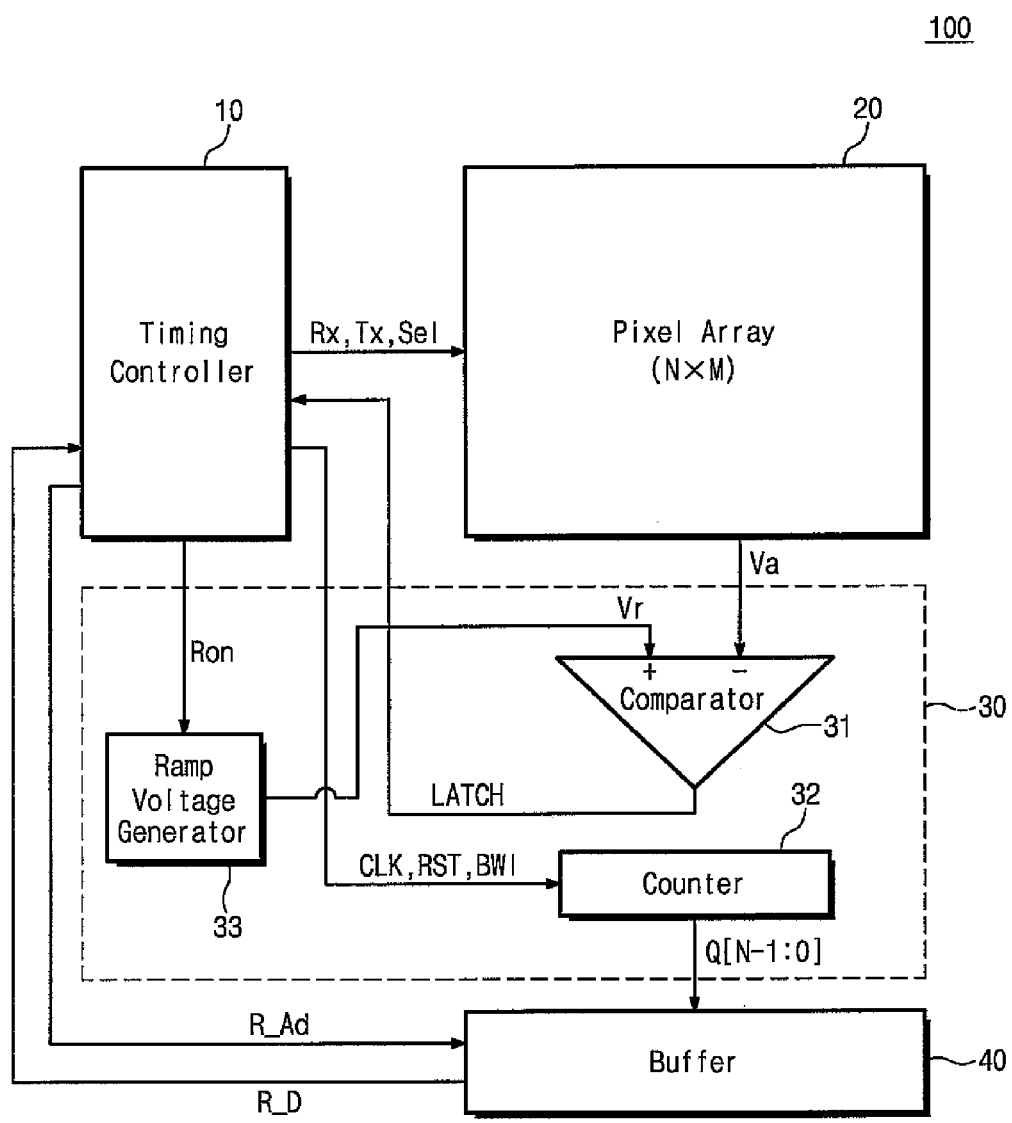
FIG. 2 is a block diagram illustrating a CMOS image sensor in accordance with an embodiment of the invention.

FIG. 2 is a block diagram illustrating a CMOS image sensor in accordance with an embodiment of the invention. Referring to FIG. 2, CMOS image sensor 100, which converts external image data into digital data and stores the digital data, comprises a timing controller 10, a pixel array 20, an analog-digital converter 30, and a buffer 40. In addition, analog-digital converter 30 comprises a comparator 31, a counter 32, and a ramp voltage generator 33.

Pixel array 20, which receives external image data (i.e., receives image data from outside of CMOS image sensor 100), outputs an analog signal Va to analog-digital converter 30 in response to control signals Rx, Tx, and Sel received from timing controller 10. Analog signal Va may also be referred to herein as a "pixel signal." Comparator 31 receives analog signal Va, and receives a ramp signal Vr from ramp voltage generator 33. As used herein, the term "ramp signal" refers to a signal, such as ramp signal Vr, wherein the voltage level of that signal increases or decreases over time (i.e., in proportion to time). Ramp signal Vr may also be referred to herein as ramp voltage Vr. The voltage level of ramp signal Vr may, for example, increase or decrease at a constant rate. Counter 32 receives a clock signal CLK, a control signal RST, and a control signal BWI. Control signal RST may be referred to herein as reset signal RST and control signal BWI may be referred to herein as inversion signal BWI. In addition, counter 32 counts in response to clock signal CLK while analog signal Va is compared with ramp signal Vr. Comparator 31 compares analog signal Va with ramp signal Vr, and outputs a comparison signal LATCH to timing controller 10 in response to detecting a defined voltage difference between analog signal Va and ramp signal Vr. When timing controller 10 stops providing clock signal CLK to counter 32, then counter 32 stops counting. When counter 32 stops counting in response to clock signal CLK stopping, a count value stored in counter 32 is digital data that corresponds to analog signal Va. The digital data that has been converted from analog signal Va is stored in buffer 40. In addition, timing controller 10 transmits a control signal R_Ad to buffer 40 in order to receive a data signal R_D from buffer 40.

Figure 3:
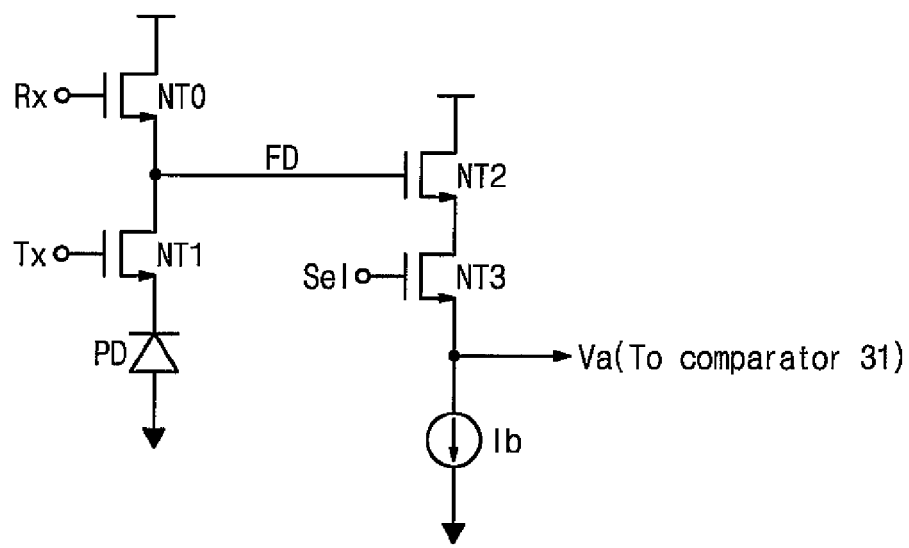
FIG. 3 is a circuit diagram illustrating a pixel of a pixel array illustrated in FIG. 2.

FIG. 3 is a circuit diagram illustrating a pixel 22 of pixel array 20 of FIG. 2. That is, pixel 22, which is illustrated in FIG. 3, is one of the N×M pixels of pixel array 20 of FIG. 2.

Referring to FIGS. 2 and 3, pixel 22 comprises four NMOS transistors NT0-NT3 and a current source Ib. A first transistor NT0, a second transistor NT1, and a photodiode PD are connected to one another in series. A drain of first transistor NT0 is connected to a power source voltage, and an anode of photodiode PD is connected to a ground voltage VSS. A gate of first transistor NT0 is connected to a control signal Rx, and a gate of the second transistor NT1 is connected to a control signal Tx.

Third transistor NT2 and fourth transistor NT3 are connected to one another in series. A drain of third transistor NT2 is connected to a power source voltage, and a drain of fourth transistor NT3 is connected to a source of third transistor NT2. A gate of the third transistor NT2 is connected to a source of first transistor NT0, which is connected to a detection node FD, and a gate of fourth transistor NT3 is connected to a control signal Sel. Additionally, a source of fourth transistor NT3 is connected to comparator 31 and a current source Ib.

First transistor NT0 initializes pixel 22 in response to a control signal Rx received from timing controller 10. Second transistor NT1 provides an analog signal received from photodiode PD to detection node FD in response to a control signal Tx received from timing controller 10. Third transistor NT2 and current source Ib form a source follower. Additionally, an analog signal Va input via the gate of third transistor NT2 is provided to comparator 31. Also, pixel 22 of FIG. 3 is selected from among a plurality of pixels 22 of pixel array 20 in response to control signal Sel, which is provided from timing controller 10 to fourth transistor NT3.

Timing controller 10 activates control signals Rx and Sel to initialize a detection node FD of pixel 22. Pixel 22 outputs an initialized analog signal Va (i.e., an initialized analog voltage Va) to comparator 31. Initialized analog signal Va may also be referred to as an "analog pixel-reset signal".

Timing controller 10 activates control signals Tx and Sel so that pixel 22 will provide external image data from photodiode PD of pixel 22 to detection node FD of pixel 22, and so that pixel 22 will output to comparator 31 an analog voltage Va corresponding to the external image data.

Analog-digital converter 30 performs digital double sampling (DDS) to relatively accurately convert an analog signal output by a pixel into a digital signal. An up-down counter has typically been used as an analog-digital converter to perform DDS.

Figure 4:
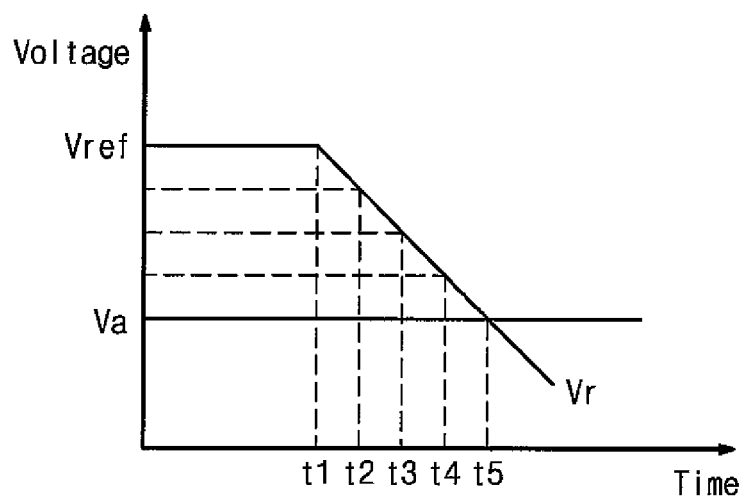
FIG. 4 is a graph of voltage versus time illustrating an analog signal Va and a ramp signal Vr.

FIG. 4 is a graph of voltage versus time illustrating analog signal Va and ramp signal Vr. Referring to FIGS. 2 through 4, ramp voltage generator 33 generates a ramp signal Vr in response to a control signal Ron received from timing controller 10. Ramp signal Vr is a voltage signal that decreases from a reference voltage level Vref at a constant rate (i.e., at a predetermined rate as time elapses).

Comparator 31 compares analog signal Va with ramp signal Vr in synchronization with a clock signal CLK of timing controller 10. At this point, timing controller 10 activates clock signal CLK to operate counter 32.

Referring to the graph of FIG. 4, which corresponds to an exemplary operation of comparator 31, from time t1 to time t5, the voltage level of analog signal Va is less than or equal to the voltage level of a ramp signal Vr. However, in accordance with an embodiment of the invention, once the voltage level of ramp signal Vr has decreased to a voltage level that is less than the voltage level of analog signal Va (i.e., once analog signal Va is greater than ramp signal Vr, which is after time t5 in the exemplary operation corresponding to the graph FIG. 4), comparator 31 activates comparison signal LATCH. When comparison signal LATCH is activated, timing controller 10 stops generating clock signal CLK, and when timing controller 10 stops generating clock signal CLK, comparator 31 stops operating and counter 32 stops operating (i.e., counter 32 stops counting). In addition, when counter 32 stops counting in response to the activation of comparison signal LATCH, the count value stored in counter 32 at that time is digital data corresponding to analog signal Va.

An up-down counter is typically used to perform DDS. However, an up-down counter occupies a relatively large area because it includes a relatively large number of gates, and power consumption increases when the CMOS image sensor operates with relatively high resolution and at a relatively high speed.

In accordance with an embodiment of the invention, an alternate counter for a digital converter of a CMOS image sensor is provided. A counter in accordance with an embodiment of the invention uses a two's complement number system to perform the function that an up-down counter typically performs in a CMOS image sensor. Inverted digital data A' of digital data A may be obtained by subtracting digital data A from a data value MAX_CODE, as shown in Equation 1. Likewise, inverted digital data A' may be obtained by inverting digital data A (i.e., inverting each of the bits of digital data A). As used herein, "inverting" data or a value means inverting each of the bits of the data or value. As used herein, "MAX_CODE" means the largest code value for a given number of bits. For example, a 4-bit MAX_CODE is "$1111_2$". In one example, assuming that a 4-bit digital data value A is "$0101_2$", then inverted digital data A' is "$1010_2$". That is, if digital data value A is "$0101_2$" (which is "5" in base ten), then inverted digital data A' (which is digital data A inverted) is "$1010_2$", which is "−6" in base ten interpreted under the two's complement number system, and is "10" in base ten when interpreted without using the two's complement number system.

In accordance with an embodiment of the invention, the difference between digital data A and digital data B may be obtained using the two's complement number system in accordance with Equation 2 below. When a counter uses the two's complement number system, a value of (B−A)−1 is found for the difference between digital data values A and B, as shown on the right hand side of Equation 3. That is, one less than the difference between digital data A and digital data B is found. Therefore, a counter using the two's complement number system accounts for the additional "−1" term on the right hand side of Equation 3. That is, during a reset operation, the counter sets the state of each flip-flop to the data value "1" (i.e., "high"), and when a clock signal is provided to the counter, the counter begins its counting with the value "0" (i.e., "0" is the first value counted).

$$A' = \text{MAX\_CODE} - A \qquad \text{Equation 1}$$

$$A' + B = \text{MAX\_CODE} + (B - A) \qquad \text{Equation 2}$$

$$\text{MAX\_CODE} + (B - A) = (B - A) - 1 \qquad \text{Equation 3}$$

A DDS counter in accordance with an embodiment of the invention uses the two's complement number system so that a result of subtracting a digital pixel-reset value (i.e., a digital data value corresponding to an analog pixel-reset signal) from a digital image value (i.e., digital data obtained by converting an analog signal that corresponds to external image data into digital data) may be readily obtained. Typically, an up-down counter performs an up-count operation to obtain a digital pixel-reset value and performs a down-count operation to obtain a difference between the digital pixel-reset value and the digital image value. Since the functionality of an up-down counter is more complicated than that of an up-counter or a down-counter, an up-down counter occupies a relatively large area. As used herein, an "analog pixel-reset signal" is an analog signal output by a pixel after the pixel has been initialized.

In accordance with an embodiment of the invention, the function that an up-down counter typically performs in a CMOS image sensor is realized using a counter that counts in one direction (i.e., using a counter that increases its count value or a counter that decreases its count value). The counter that counts in one direction may also be described as a counter that counts monotonically. For example, an up-count operation is performed to obtain a digital pixel-reset value, and then, to obtain a difference between the digital pixel-reset value and a digital image value, the digital pixel-reset value is inverted and then another up-count operation is performed on the inverted digital pixel-reset value. That is, a DDS counter in accordance with an embodiment of the invention performs an inversion operation so that the DSS counter may have a relatively small area and relatively low power consumption. As used herein, the term "inversion operation" means a process of inverting digital data or a digital value. A DDS counter using the two's complement number system, in accordance with an embodiment of the invention, is illustrated in FIGS. 5 and 6.

Figure 5:
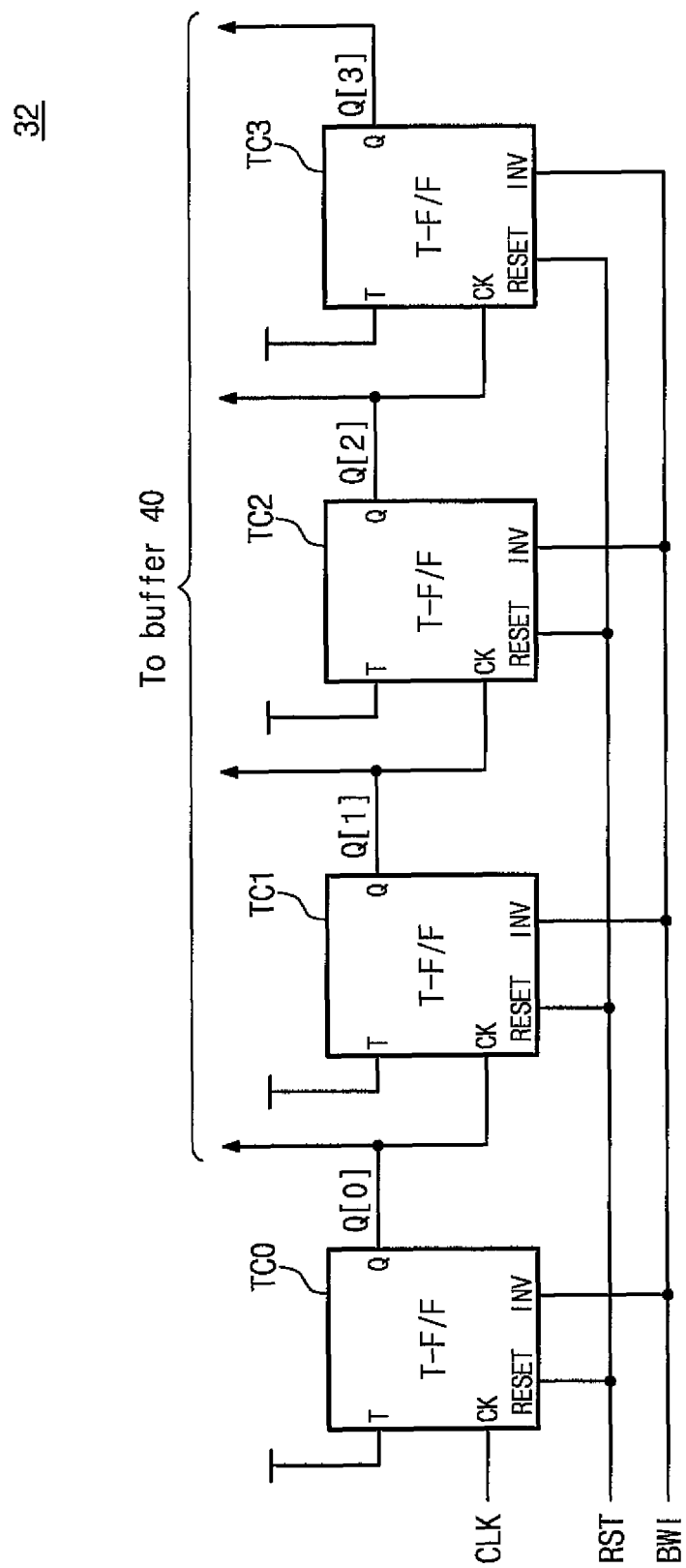
FIG. 5 is a circuit diagram illustrating a counter shown in FIG. 2.
Figure 6:
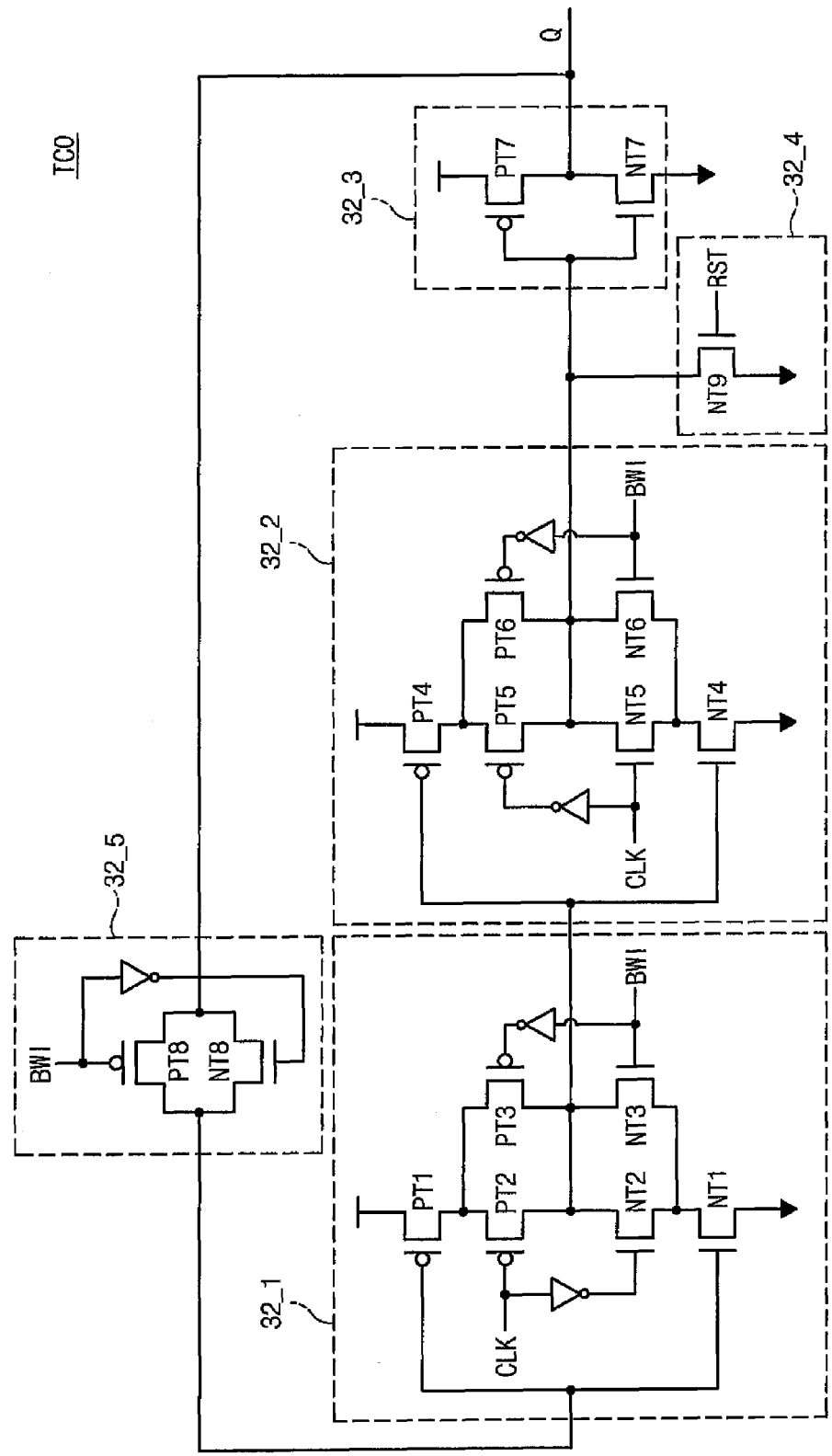
FIG. 6 is a circuit diagram illustrating inner circuitry of a T-flip-flop of the counter illustrated in FIG. 5.

FIG. 5 is a circuit diagram illustrating counter 32 of FIG. 2 in accordance with an embodiment of the invention. Referring to FIGS. 2 and 5, counter 32 comprises a T-flip-flop (T-F/F). Counter 32 illustrated in FIG. 5 is a 4-bit counter 32, and 4-bit counter 32 comprises four T-flip-flops TC0 through TC3.

Each of T-flip-flops TC0 through TC3 comprises a first input terminal T (i.e., a toggle terminal T), a second input terminal CK, a third input terminal RESET, a fourth input terminal INV, and an output terminal Q. First input terminal T of first T-flip-flop TC0 is connected to a power voltage, and second input terminal CK of first T-flip-flop TC0 is connected to a clock signal CLK received from timing controller 10.

Second input terminal CK of second T-flip-flop TC1 is connected to output terminal Q of first T-flip-flop TC0. Second input terminal CK of third T-flip-flop TC2 is connected to output terminal Q of second T-flip-flop TC1. Also, second input terminal CK of fourth T-flip-flop TC3 is connected to output terminal Q of third T-flip-flop TC2. First through fourth T-flip-flops TC0 through TC3 each further comprise third input terminal RESET for initialization and fourth input terminal INV for inverting data.

FIG. 6 illustrates inner circuitry of first T-flip-flop TC0 of counter 32 (i.e., DDS counter 32) illustrated in FIG. 5 in accordance with an embodiment of the invention. The inner circuitry of each of second through fourth T-flip-flops TC1 through TC3 is similar to that of first T-flip-flop TC0 illustrated in FIG. 6. However, second through fourth T-flip-flops TC1 through TC3 do not receive clock signal CLK, for example.

Referring to FIGS. 5 and 6, first T-flip-flop TC0 comprises a first inverter 321, a second inverter 32_2, and a third inverter 32_3, each of which is controlled by control signal BWI and clock signal CLK. First T-flip-flop TC0 also comprises a transmission gate 32_5, which is controlled by control signal BWI, and an NMOS transistor 32_4, which is controlled by control signal RST.

First, second, and third inverters 32_1, 32_2, and 32_3 are connected in series. In addition, a signal on output terminal Q of first T-flip-flop TC0 is fed back to an input of first inverter 32_1 through transmission gate 32_5. An output of second inverter 32_2 is connected to a drain of an NMOS transistor 32_4. NMOS transistor 32_4 is controlled by control signal RST, and a drain of NMOS transistor 32_4 is also connected to an input of third inverter 32_3.

When counter 32 is operating normally, counter 32 initializes an output value of counter 32 in response to an activated control signal RST. That is, when reset signal RST is activated, each of first through fourth outputs Q[0] through Q[3] of first through fourth T-flip-flops TC0 through TC3, respectively, is set to the data value "1" (i.e., a logic high level). Referring to FIG. 6, during an up-count operation of counter 32, a value output from first T-flip-flop TC0 is input to third inverter 32_3 of first T-flip-flop TC0 via first and second inverters 32_1 and 32_2 of first T-flip-flop TC0 in accordance with clock signal CLK. In addition, an output of third inverter 32_3 is delivered to an output terminal Q.

During an inversion operation in counter 32, the output value of first T-flip-flop TC0 is not input to first inverter 32_1 via transmission gate 32_5, which is deactivated in response to an activated control signal BWI. Also, in response to activated control signal BWI, first T-flip-flop TC0 inverts a data value (i.e., a bit) input to first inverter 32_1 through first, second, and third inverters 32_1, 32_2, and 32_3. In addition, an output of third inverter 32_3 is delivered to output terminal Q.

Figure 7:
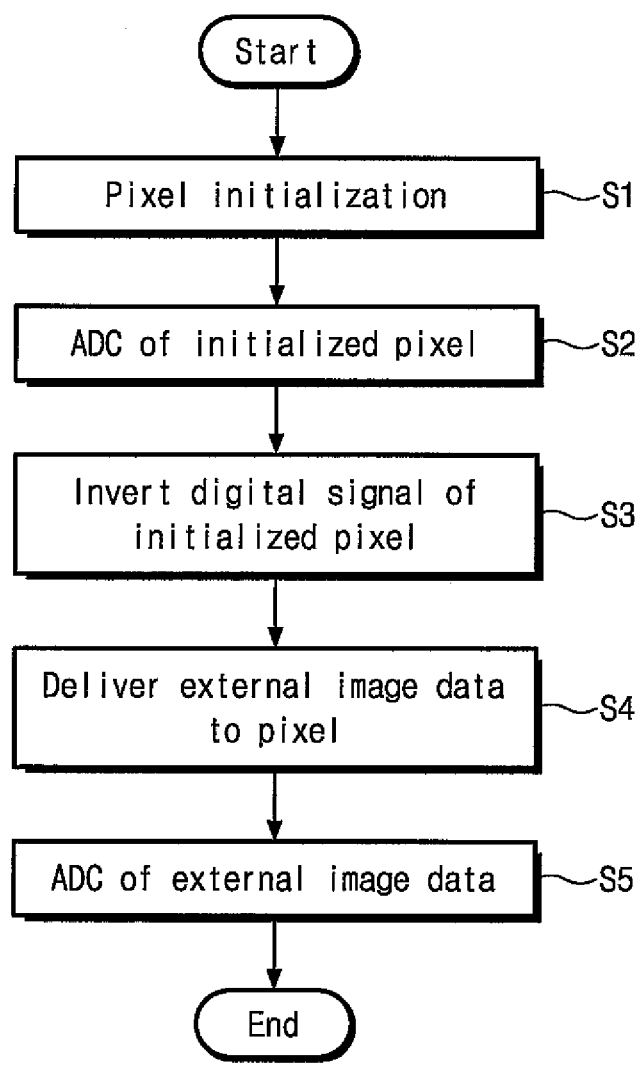
FIG. 7 is a flowchart illustrating a digital double sampling method in accordance with an embodiment of the invention for a CMOS image sensor in accordance with an embodiment of the invention.
Figure 8:
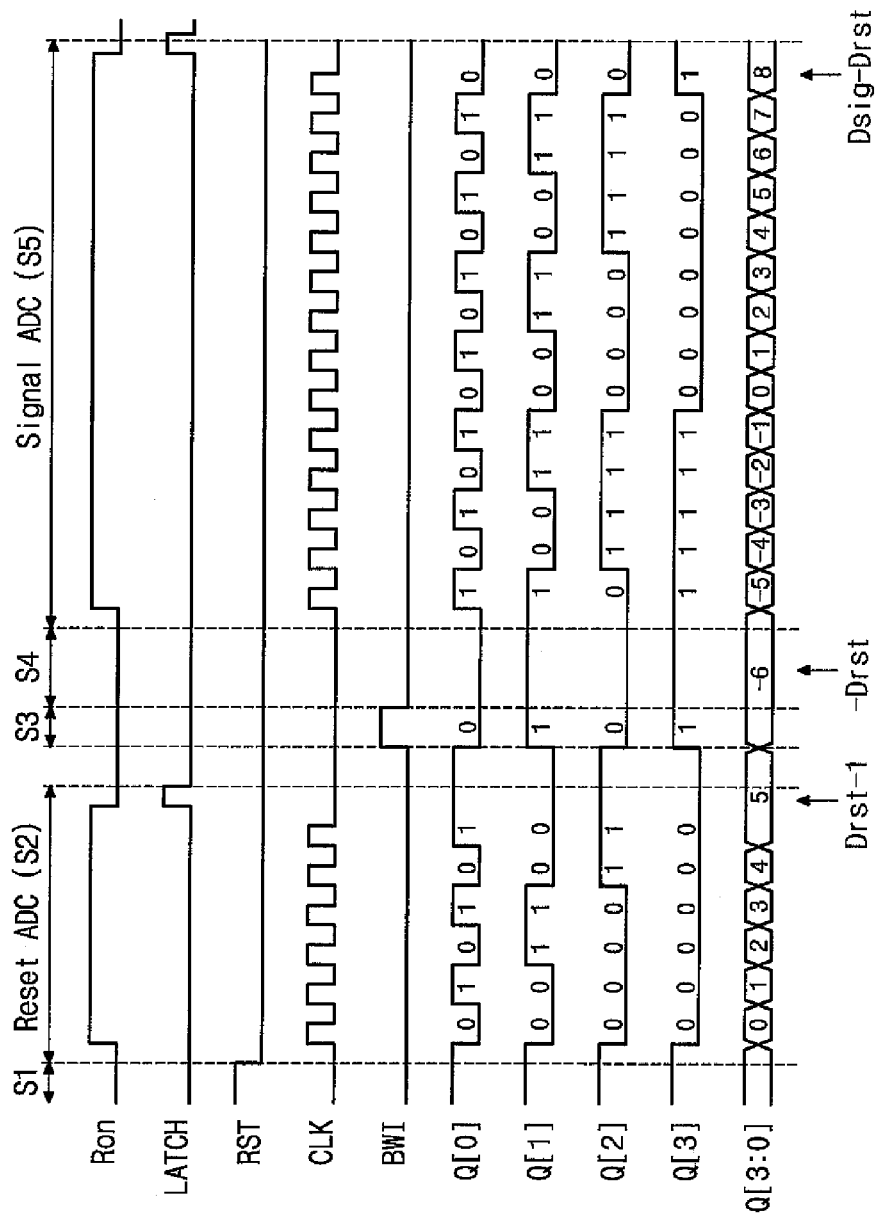
FIG. 8 is a timing diagram illustrating an exemplary operation of the CMOS image sensor of FIG. 2 in accordance with the method of FIG. 7.

FIG. 7 is a flowchart illustrating a digital double sampling method for a CMOS image sensor in accordance with an embodiment of the invention. FIG. 8 is a timing diagram illustrating an exemplary operation of the CMOS image sensor of FIG. 2 in accordance with the method of FIG. 7. Referring to FIGS. 2 through 8, a digital double sampling operation of CMOS image sensor 100 is roughly divided into a reset mode and an image input mode. The reset mode is divided into a reset operation S1 and a reset analog-digital-conversion (ADC) operation S2. The image input mode is divided into an inversion operation S3, a signaling operation S4, and a signal ADC operation S5.

In reset operation S1, in response to control signals Rx and Sel received from timing controller 10, a pixel 22 of pixel array 20 is initialized and pixel 22 outputs an initialized analog signal Va (i.e., an analog pixel-reset signal). Also, in response to reset signal RST from timing controller 10, a count value stored in counter 32 is reset (i.e., initialized).

In reset ADC operation S2, timing controller 10 deactivates control signal RST and activates clock signal CLK to convert initialized analog signal Va (output by pixel 22) into a digital signal Drst. A digital data value obtained by converting an initialized analog signal Va into a digital data value is defined as Drst. However, because counter 32 begins with 0 when counting during reset ADC operation S2, counter 32 actually stores a digital value Drst−1 at the end of reset ADC operation S2. As an example, in the exemplary digital double sampling operation illustrated in FIG. 8, at the end of reset ADC operation S2, while digital value Drst has a value of 6, counter 32 actually stores a digital value Drst−1, which has a value of "$0101_2$" (which is "5" in base ten).

In inversion operation S3, counter 32 inverts digital value Drst−1 in response to the activation of control signal BWI of timing controller 10. Thus, in the exemplary operation illustrated in FIG. 8, digital value Drst−1, which is "$0101_2$" (or "5" in base ten), is inverted to obtain a digital value −Drst, which is "$1010_2$" (or "−6" in base ten under the two's complement number system).

In signaling operation S4, pixel array 20 receives external image data and outputs a new analog signal Va (i.e., a detection voltage Va) corresponding to the external image data. Digital data Dsig is obtained by converting analog signal Va corresponding to the external image data into digital data.

In signal ADC operation S5, timing controller 10 activates clock signal CLK provided to counter 32, and counter 32 calculates a data value Dsig−Drst in response to clock signal CLK. That is, because counter 32 starts counting from −Drst in signal ADC operation S5, at the end of signal ADC operation S5, a count value stored in counter 32 will be Dsig−Drst. For example, in the exemplary operation illustrated in FIG. 8, when counter 32 begins counting, the value stored in counter 32 is digital value −Drst, which is "$1010_2$" (or "−6" in base ten under the two's complement number system), so, when counter 32 stops counting, counter 32 will store a count value of Dsig−Drst, which, in the example illustrated in FIG. 8, is equal to "$1000_2$" (or "8" in base ten when the value is not interpreted under the two's complement number system).

An embodiment of the invention provides a digital double sampling counter that counts in only one direction but can also perform the function typically performed by an up-down counter in a CMOS image sensor using the two's complement number system. Also, an embodiment of the invention provides a digital double sampling counter that has a relatively small number of gates and that consumes a relatively low amount of power.

In addition, an embodiment of the invention provides a CMOS image sensor having a counter that counts in only one direction but can also perform the function typically performed by an up-down counter in a CMOS image sensor using the two's complement number system. Also, an embodiment of the invention provides a digital double sampling method that uses a relatively small number of gates and consumes a relatively low amount of power.

Although embodiments of the invention have been described herein, the embodiments may be modified by one of ordinary skill in the art without departing from the scope of the invention as defined by the accompanying claims.

What is claimed is:

1. A complementary metal oxide semiconductor (CMOS) image sensor comprising:
   a pixel configured to output an analog voltage;
   an analog to digital converter comprising:
      a comparator configured to compare the analog voltage and a reference voltage;
      a counter configured to count a difference between a count value corresponding the analog voltage and a count value corresponding to an initialized voltage of the pixel, the counter comprising:
         a first flip-flop comprising a first clock terminal configured to receive a clock signal, a first inverting terminal configured to receive an inversion signal, and a first output terminal configured to output a first output signal; and
         a second flip-flop comprising a second clock terminal configured to receive the first output signal, a second inverting terminal configured to receive the inversion signal, and a second output terminal configured to provide a second output signal,
      wherein, when the inversion signal is activated, the first flip-flop inverts data apparent at the first output terminal of the first flip-flop, and the second flip-flop inverts data apparent at the second output terminal of the second flip-flop,
   wherein the inversion signal is activated after counting the count value corresponding to the initialized voltage of the pixel and before counting the count value corresponding to the analog voltage.

2. The CMOS image sensor of claim 1, wherein the first inverting terminal is electrically connected to the second inverting terminal.

3. The CMOS image sensor of claim 1, the first flip-flop further comprising a first reset terminal configured to receive a first reset signal.

4. The CMOS image sensor of claim 3, the second flip-flop further comprising a second reset terminal configured to receive a second reset signal.

5. The CMOS image sensor of claim 1, wherein the first flip-flop and the second flip-flop are T-flip-flops.

6. The CMOS image sensor of claim 1, wherein the inversion signal is activated one time after counting the count value corresponding to the initialized voltage of the pixel and before counting the count value corresponding to the analog voltage of the pixel.

* * * * *